United States Patent [19]
Vanderwetf

[11] Patent Number: 4,943,156
[45] Date of Patent: Jul. 24, 1990

[54] OFF AXIS FRESNEL REFLECTOR FOR LIQUID CRYSTAL DISPLAY

[75] Inventor: Dennis F. Vanderwetf, Cottage Grove, Minn.

[73] Assignee: Minnesota Mining and Manufacturing Company, St. Paul, Minn.

[21] Appl. No.: 243,588

[22] Filed: Sep. 12, 1988

[51] Int. Cl.$^5$ .............................................. G03B 21/00
[52] U.S. Cl. ................................ 353/66; 353/DIG. 4; 353/38
[58] Field of Search ............................. 353/38, 65–67, 353/120–122, DIG. 3, DIG. 4, DIG. 5, 102; 350/452, 613, 331 R, 338, 345, 103, 167

[56] References Cited

U.S. PATENT DOCUMENTS 3,293,982 12/1966 Appeldorn .
3,708,222 1/1973 Stern ........................ 350/452 X
4,652,101 3/1987 Grunwald .

FOREIGN PATENT DOCUMENTS 2196165A 4/1988 United Kingdom .

OTHER PUBLICATIONS

W. C. Connolly, "Projected Liquid-Crystal Computer Displays", The Physics Teacher, Sep. 1955, pp. 382–383.

Primary Examiner—Harry N. Haroian
Attorney, Agent, or Firm—Donald M. Sell; Walter N. Kirn; David W. Anderson

[57] ABSTRACT

A liquid crystal display assembly for use with a reflective type overhead projector includes a liquid crystal display and an attached Fresnel reflector portion which is off-axis in that the center of the reflector is not included in the Fresnel reflector portion so that a spurious bright spot coinciding in the projected image with the center of the Fresnel reflector is eliminated.

4 Claims, 2 Drawing Sheets

OFF AXIS FRESNEL REFLECTOR FOR LIQUID CRYSTAL DISPLAY

Background of The Invention

1. Field of the Invention

The present invention relates to overhead projectors, particularly those of the reflective type.

2. Description of the Prior Art

Recently several types of liquid crystal displays (LCD) for use on transmissive stage overhead projectors have become commercially available, and have become quite useful for the projection of computer generated text and graphic information. These transmissive displays are preferably of the high contrast supertwist type, multiplex addressed, with a typical 640 pixel horizontal by 200 pixel vertical resolution. The display area is usually rectangular, and is usually used in the horizontal or landscape mode. These displays are not directly usable with the more portable type of overhead projectors, the reflective stage type such as that described in U.S. Pat. No. 3,293,982 issued to Appeldorn.

Although the LCD panel could be set directly on the reflective stage and an image produced, the large vertical separation between the LCD panel and the reflective stage of the overhead projector results in severe double imaging in the projected image. Several attempts have been made to reduce the separation of the LCD panel and the reflector for use on a reflective overhead projector. For example, as described in W. C. Connolly, "Projected Liquid Crystal Computer Displays", The Physics Teacher, Sept. 1985, pp. 382–3, a liquid crystal computer display is used in reflective overhead projection by the addition of a second-surface Fresnel reflector underneath the display. The use of a second-surface Fresnel reflector produces a double imaging effect of the projected LCD image plane.

U.S. Pat. No. 4,652,101 and U.K. patent application No. 2,196,165 describe an LCD panel for use in reflective overhead projection, the image being produced by placing a second-surface Fresnel reflector directly beneath the LCD panel. In these documents, the LCD image plane-to-Fresnel reflector distance is decreased by incorporating the Fresnel lens as a permanent component of the LCD panel. Thus, custom-built LCD panels are required and less expensive, commercially available standard LCD panel displays cannot be used.

Summary of the Invention

The current invention reduces the problem of double imaging by minimizing the separation between the LCD image plane and the Fresnel reflector. Yet there are no permanent modifications to the display panel, so the panel can easily be converted from reflective to transmissive operation, or vice-versa, by the simple addition or removal of auxiliary optical components.

This invention consists of the modification of a standard type transmissive LCD panel for use on a reflective stage overhead projector by the addition of a first surface Fresnel reflector to the bottom of the display. The groove frequency of this Fresnel reflector is controlled to further minimize the separation of the reflecting grooves from the LCD image plane. This type of Fresnel reflector reduces the double imaging effect to a negligible level. The Fresnel reflector is of the off-axis type to eliminate spurious lamp reflections to the projected image.

Brief Description of the Drawings

The present invention will be more particularly described with respect to the drawings, wherein like numbers refer to like parts in the several views, and wherein.

Detailed Description of The Invention

Figure 1:
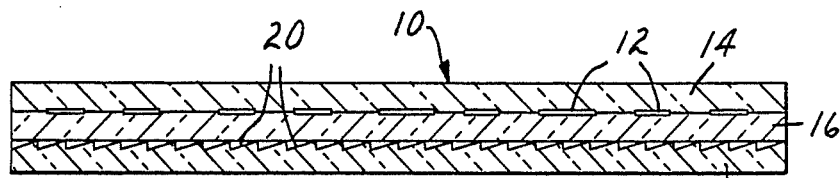
FIG. 1 is a cross-sectional, elevational view of an LCD panel and a Fresnel reflector according to one embodiment of the present invention.
Figure 2:
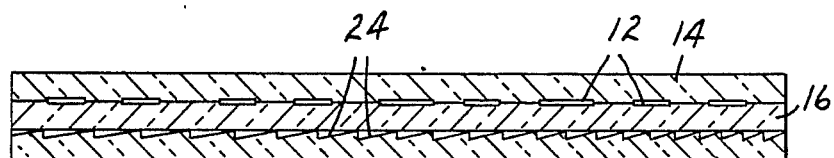
FIG. 2 is a cross-sectional, elevational view of an LCD panel and a Fresnel reflector according to a second embodiment of the present invention.

The construction of a typical commercially available multiplex addressed LCD panel for use with transmissive stage overhead projectors is shown in FIGS. 1 and 2, and generally indicated as 10. A twisted-nematic liquid crystal imaging material 12 is located between two glass plates 14 and 16, each plate 14 or 16 having a thickness of approximately two millimeters. On the upper and lower surfaces of these plates 14, 16 is conventionally and preferably a layer of polarizing material. An array of transparent electrodes (not shown) on the insides of the glass plates 14, 16 determines the switching of the pixels from a transparent to an opaque state.

In this invention, an auxiliary first-surface Fresnel reflector section 18 is attached by clips or other means (not shown) to the LCD panel 10, such that its reflecting grooves 20 are in close proximity to the bottom plate 16. Double imaging can be reduced by decreasing the distance between the reflecting grooves 20 and the LCD image plane 12.

One way to decrease the separation between the reflecting grooves 20 and the LCD panel 10 is to utilize a first surface Fresnel reflector, indicated as 18 in FIG. 1 and 22 in FIG. 2. Separation can be further reduced by minimizing the depth of the reflecting grooves 20 and 24. One way to reduce the depth of the grooves is by the use of a Fresnel reflector with an exceptionally small, constant groove width. This approach is illustrated by the grooves 20 of FIG. 1. This approach increases the number of grooves that must be tooled in the master die and thus increases expense.

Figure 3:
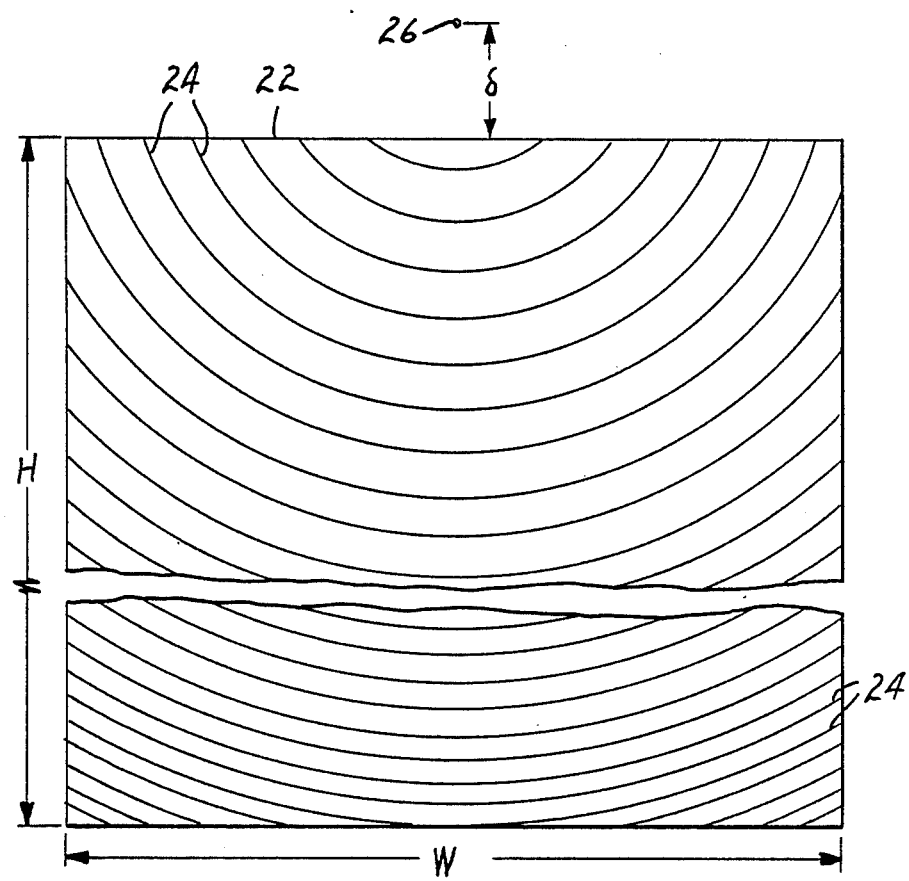
FIG. 3 is a plan view of the Fresnel reflector of FIG. 2.

Another approach is the use of a variable groove 24 width, as shown in FIGS. 2 and 3, wherein the groove width progressively decreasing from a larger value at the center to a much smaller value at the edge of the reflector 22. This allow the maximum groove 24 depth to be reduced without significantly increasing the total number of grooves 24. The small resultant separation between the grooves 24 of the reflector 22 and the lower glass plate 16 of the LCD panel 10 reduces the effect of double imaging. This first-surface Fresnel section 18 or 22 emulates the focusing action of the second-surface Fresnel lens stage of a conventional reflective overhead projector, and the section utilized depends on where the LCD panel 10 is to be placed on the projector stage. This reflective LCD panel assembly, consisting of the LCD panel 10 and the Fresnel reflector 18 or 22 can be easily reconverted to a transmissive type LCD panel by removal of the auxiliary reflector 18 or 22, and the overhead projector can be used in its normal mode by simply removing the reflective LCD panel 10 and its associated Fresnel reflector 18 or 22 from the stage area.

The groove angles, α, of the first-surface Fresnel reflector 18 or 22 are described by the following equation, derived from the sag equation of a general aspheric surface:

$$\text{TANGENT}(\alpha) = \frac{2YC}{1 + \sqrt{1 - (K+1)C^2Y^2}} + \frac{(K+1)C^3Y^3}{\sqrt{1 - (K+1)C^2Y^2}\,[1 + \sqrt{1 - (K+1)C^2Y^2}\,]^2} + 4dY^3 + 6eY^5 + 8fY^7 + 10gY^9 \quad (1)$$

where:
Y = distance from lens center to groove center
C = vertex curvature
K = conic constant
d, e, f, g = aspheric deformation coefficients When it is desired to progressively decrease the groove 24 width from the lens center 26 to its edge, in order to minimize the maximum groove 24 depth, there are several methods which depend on how the groove 24 width is to be varied. One method of calculation, that yields a linear decrease in groove 24 width between specified values at the Fresnel reflector center and edge, is obtained from the following group of recursive equations:

$$Y\{1\} = W_i/2 \quad (2)$$
$$Y\{N\} = [Y\{N-1\} + W_i]/[1 + (W_f - W_i/A] \quad (3)$$
$$W\{N\} = W_i - Y\{N\} \ast (W_f - W_i)/A \quad (4)$$

where:
W{N} = width of Nth groove from reflector center
$W_i$ = width of groove at reflector center
$W_f$ = width of groove at reflector edge (aperture boundary).
Y{N} = distance from reflector center to center of Nth groove
A = lens half-aperture Specific Examples A specific design example is now given for the first-surface, off-axis Fresnel reflector 22. The first-surface Fresnel reflector 22 emulates the focal length of the second-surface Fresnel reflector that is an integral part of the stage of a conventional overhead projector, and has a focal length of 177.6 millimeters. The groove angles of this first-surface reflector 22 are described by equation (1) with the following parameters:

$$C = 0.0027621 \text{ mm}^{-1}$$
$$K = -1.19693$$
$$d = 4.7211 \, E\text{-}10$$
$$e = 2.4322 \, E\text{-}15$$
$$f = -4.4873 \, E\text{-}20$$
$$g = 2.8433 \, E\text{-}25$$

FIG. 3 is a plan view of the off-axis first surface Fresnel reflector 22. The rectangular focusing area has a height, H, of 145 millimeters and a width, W, of 230 millimeters. For conventional Fresnel reflectors used in LCD projection, where the Fresnel center actually lies in the area to be projected, there is an undesirable bright spot in the projected image. This is caused by specular virtual images of the light source off the planar surfaces in the LCD panel, which are seen by the projection lens and imaged in the direction of the screen. Since this real image of the light source is formed between the projection lens and screen, a spurious defocused image, or bright spot, occurs in the screen area and causes a loss of contrast. The position of this bright spot always occurs at the position of the Fresnel reflector center in the projected image. Hence by removing the Fresnel reflector's center from the projected stage area by use of an off-axis Fresnel reflector 22, this annoying bright spot is eliminated.

The Fresnel reflector center 26, shown in phantom, is displaced from the upper edge of the actual Fresnel reflector 22 by a distance, δ, of about 20 millimeters. This separations ensures that the defocused image of the light source falls outside of the projected LCD image.

For a maximum groove 24 depth of 0.10 millimeters at the reflector 22 lower corner, as viewed in FIG. 3, corresponding to a reflector half-aperture of 201 millimeters, use of equations (2)-(4) give the required groove 24 frequency variation. The groove 24 width of the Fresnel reflector 22 at the top of the panel is about 0.91 millimeters, with a linear decrease to 0.10 millimeters at the edge of the lens aperture, or reflector 22 lower corner, with 495 as the number of reflecting grooves 24 in the panel.

Figure 4:
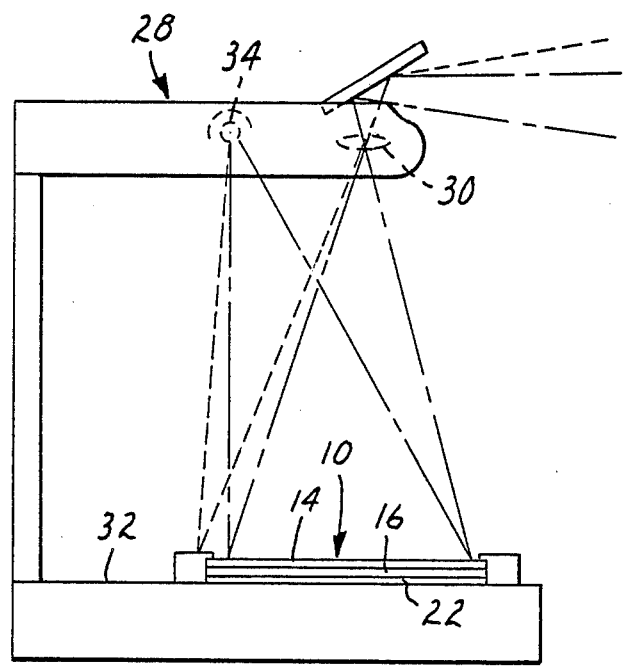
FIG. 4 is a schematic, plan view of the LCD panel and Fresnel reflector of the present invention in combination with a reflective type overhead projector.

FIG. 4 shows the actual use of the reflective display panel assembly 10 and 18 or 22 on a reflective stage overhead projector 28. The preferred type of projector 28 is one in which a projection lens 30 is centered over a primary stage 32, and which uses an unsymmetrical reflecting stage 32, as described in Appeldorn, U.S. Pat. No. 3,293,982. The rectangular LCD panel assembly 10 and 18 or 22 is then positioned on this primary stage 32 such that the grooves 20 or 24 of the first surface reflector 18 or 22 have the same center of curvature 26, e.g. Fresnel center, as the primary second surface reflector of the projector 28. The separation of the top edge of the LCD 10 from the Fresnel center 26 then assures that spurious images of the light source 34 by the projection lens 30 are not formed in the light path to the projected LCD image.

I claim:
1. A liquid crystal display assembly for use with a reflective type overhead projector comprising:
a liquid crystal display including two transparent glass plates between which is disposed a liquid crystal imaging material;
a first-surface, variable groove with Fresnel reflector portion disposed adjacent one of said liquid crystal glass plates wherein said Fresnel reflector portion is a first-surface reflector portion in that said Fresnel reflector portion includes a reflective surface immediately adjacent said liquid crystal display, wherein said Fresnel reflector portion is a variable groove width Fresnel reflector portion in that the grooves of said reflective surface progressively decrease outwardly from the center of said Fresnel reflector portion, said first-surface reflective surface and said variable groove width combining to minimize the distance between said reflective surface and said liquid crystal imaging material to minimize double imaging of an image projected by said overhead projector and wherein said Fresnel reflector portion is off-axis in that the center of said reflector is not included in said Fresnel reflector portion so that a spurious bright spot coinciding in the projected image with the center of said Fresnel reflector is eliminated.

2. A liquid crystal display assembly according to claim 1 wherein said grooves of said Fresnel reflector portion decrease in width linearly from the center of said Fresnel reflector portion.

3. An overhead projector comprising:
a base supporting a reflective stage;
a light source suspended above said stage for directing light to said stage;
a projection lens suspended above said stage for receiving light reflected light to an image plane;
a first-surface, variable groove width Fresnel reflector portion disposed adjacent one of said liquid crystal glass plates wherein said Fresnel reflector portion is a first-surface reflector portion in that said Fresnel reflector portion includes a reflective surface immediately adjacent said liquid crystal display, wherein said Fresnel reflector portion is a variable groove width Fresnel reflector portion in that the grooves of said reflective surface progressively decrease outwardly from the center of said Fresnel reflector portion, said first-surface reflective surface and said variable groove width combining to minimize the distance between said reflective surface and said liquid crystal imaging material to minimize double imaging of an image projected by said overhead projector and wherein said Fresnel reflector portion is off-axis in that the center of said reflector is not included in said Fresnel reflector portion so that a spurious bright spot coinciding in the projected image with the center of said Fresnel reflector is eliminated.

4. A liquid crystal display assembly according to claim 3 wherein said grooves of said Fresnel reflector portion decrease in width linearly from the center of said Fresnel reflector portion.

* * * * *